April 12, 1949.   D. THRONE   2,466,786
CAMERA LENS SHADE

Filed July 11, 1947   2 Sheets-Sheet 1

INVENTOR.
Dallas Throne
BY Hazard & Miller
Attorneys

April 12, 1949.   D. THRONE   2,466,786
CAMERA LENS SHADE
Filed July 11, 1947   2 Sheets-Sheet 2

INVENTOR.
Dallas Throne
BY Hazard & Miller
Attorneys

Patented Apr. 12, 1949

2,466,786

UNITED STATES PATENT OFFICE 2,466,786

CAMERA LENS SHADE

Dallas Throne, La Verne, Calif., assignor of one-half to James C. Reher, Jr., Covina, Calif.

Application July 11, 1947, Serial No. 760,390

1 Claim. (Cl. 88—1)

This invention relates to a camera lens shade and has been primarily designed for application to a conventional type of camera popularly known as the "graphic" type camera although it may be applied to other types of cameras having similar constructions or characteristics.

A primary object of the invention is to provide a lens shade for cameras which will effectively shade the camera lens from extraneous or undesired light when in extended or operative position and which is so mounted on the camera that it will not have to be disturbed or removed when it is desired to change the camera lens. In this manner the lens of the camera may be removed and replaced whenever desired without removing or disturbing the lens shade. This form of construction is highly advantageous to users of cameras of this type in that frequently it is necessary to change lenses with great rapidity and if the lens shade should be mounted either on the lens barrel or on the lens board it would interfere with the substitution of lenses or lens boards and would seriously increase the time required to effect a substitution of lenses.

Another object of the invention is to provide a camera lens shade having the above mentioned characteristics which is so designed that it may be applied to a conventional type of camera without modifying or altering the construction of the camera and which, when it is desired to close the camera, may assume a collapsed position overlying the lens wherein it will not interfere with the closing movement of the cover of the camera.

With the foregoing and other objects in view, which will be made manifest in the following detailed description and specifically pointed out in the appended claim, reference is had to the accompanying drawings for an illustrative embodiment of the invention, wherein:

Figures 1, 4:
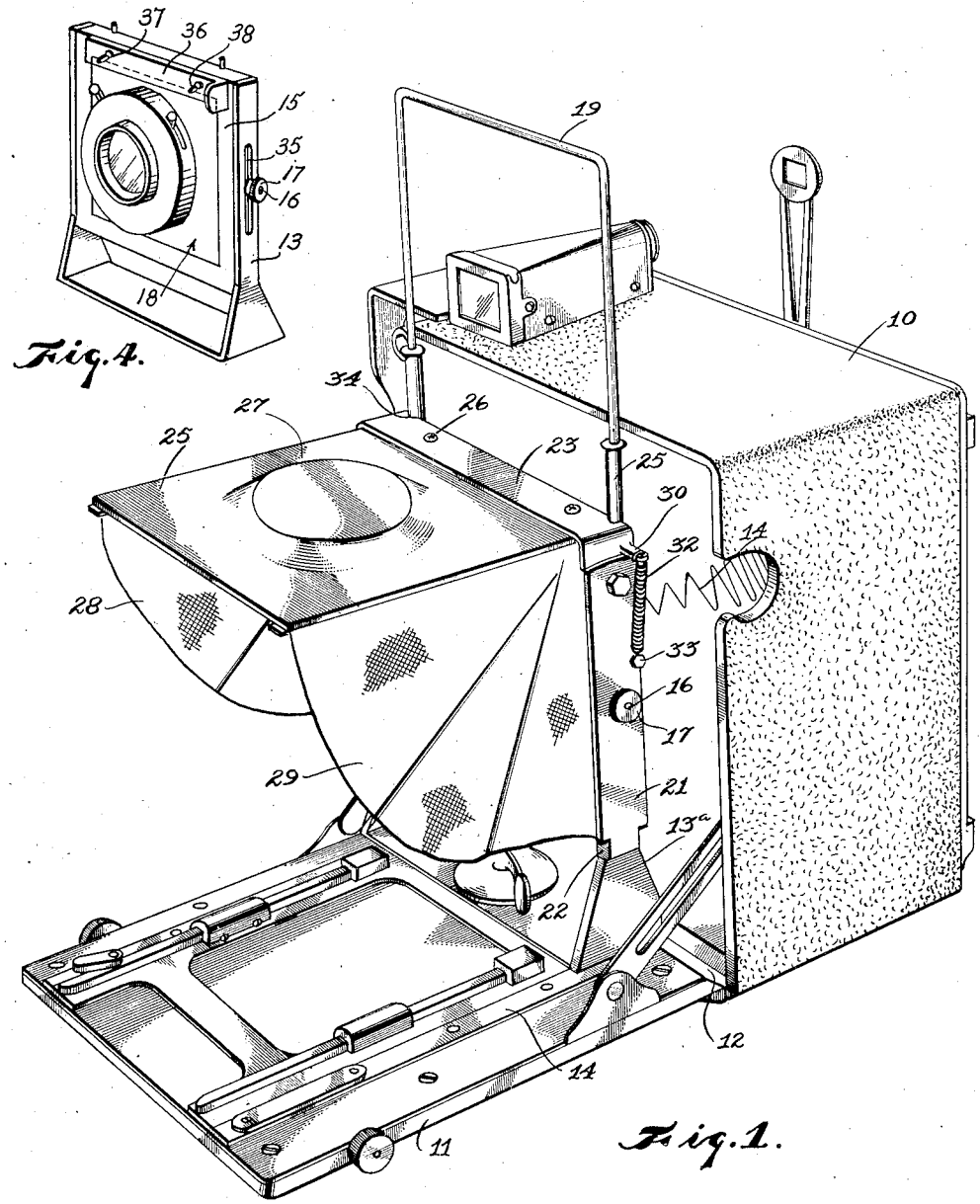
Figure 1 is a perspective view of a conventional type of graphic camera illustrating the camera lens shade embodying the invention as having been applied thereto and illustrating the lens shade in extended or operative position.
Fig. 4 shows a perspective view of part of the camera before the lens shade of the present invention is applied.

Referring to the accompanying drawings wherein similar reference characters designate similar parts throughout, the conventional graphic camera consisting of a box-like body generally indicated at 10 having a cover 11 hingedly connected thereto as indicated at 12. A lens board frame standard 13 is adjustably mounted adjacent each side of the box 10 for movement relatively thereto. This standard may assume either a position entirely within the body 10 or may be shifted forwardly therefrom on lens or guides 14 that are mounted on the cover 11. A lens board frame 15 (see Fig. 3) as extending laterally therefrom on each side a rising front screw 16 that extends through a slot 35 in the standard 13 and which is equipped with a thumb nut 17. The above described construction is conventional and is so designed that on loosening the thumb nuts 17 the lens board frame may be vertically adjusted with respect to the standard 13 as is required in taking various types of photographs.

Within the lens board frame there is detachably secured a lens board on which the lens, its barrel and associated structure, including an iris and a shutter, all of which are generally indicated at 18 are mounted. This lens board together with its lens may be bodily removed from within the lens board frame 15 to effect a substitution of lenses. In Fig. 4 it can be seen that there is a plate 36, which may be a name plate, slidably mounted on the front of the lens board frame 15 by means of headed studs 37 which fit through slanted slots 38 in plate 36, the fit between plate 36 and the headed studs and the lens board frame being such that the plate drags against the lens board frame and the lens board so that when plate 36 is pushed to its uppermost position it will remain there and the lens board with the lens and shutter removed. When the plate 36 is pushed to its lowermost position it will hold the lens board within the lens board frame. Frequently, cameras of this type are provided with a sport frame or sighting frame consisting of an inverted U-shaped wire 19 the ends of which are telescopically slidable in ferrules 20 that are mounted by means of brackets not shown on the sides of the lens board frame 15 near the upper corners thereof.

The camera lens shade embodying the present invention consists of two opposed side plates, one of which is illustrated at 21 and which have apertures intermediate the ends thereof through which the rising front screws 16 extend. The lower ends of these side plates have inwardly extending wings or lugs 22 designed to embrace the front or rear side of the lens board frame adjacent the bottom thereof. Thus, in applying the side plates 21 to the sides of the lens board frame it is merely necessary to remove the thumb nuts 17 and slip the side plates 21 onto the sides of the lens board frame with the apertures in the side plates allowing the rising front screws 16 to be passed therethrough. During this application, the wings 22 merely slip over the front and rear edges of the lens board frame and when the side plates are thus applied the thumb nuts 17 are re-applied to the rising front screws 16 locking the side plates 21 in position against the sides of the lens board frame.

A connecting strip or top 23 extends across the top of the lens board frame and has its ends bent downwardly and apertured to receive pivot bolts 24. These pivot bolts extend through the upper ends of the side plates 21 and the downwardly bent ends of the top 23. The connecting strip or top 23 is disposed a sufficient distance above the top of the lens board frame so that it may swing or turn about the horizontal axis of the pivot bolts 24 without interference with the top of the lens board frame. A plate 25 constitutes the major portion of the lens shield and is rigidly secured to the connecting strip 23 such as by screws 26. This shield being rigid with the top 23 is swingable therewith. The plate 25 preferably has its center portion depressed or embossed as indicated at 27 so as to accommodate on its underside the barrel of the lens and the associated structure indicated at 18. When the plate 25 is swung downwardly into a vertical position overlying the lens, side flaps 28 and 29 formed of foldable fabric are provided and these side flaps have their upper edges cemented or otherwise secured to the side edges of the plate 25. The rear or vertical edges of the side flaps are cemented or otherwise secured to the inner faces of the side plates 21.

Figure 2:
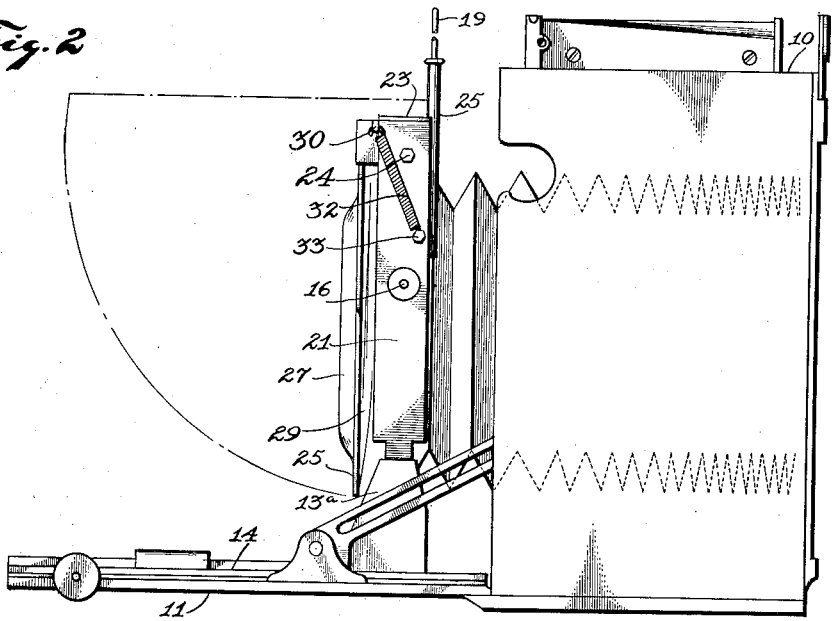
Figure 2 is a view in side elevation of the camera illustrated in Figure 1 but showing the lens shade in collapsed position.

On at least one downwardly bent end of the connecting strip or top 23 there is an outstanding lug 30 which is connected by means of a tension spring 32 to a stud 33 on the side plate 21. The lug 30 is so arranged on the end of the connecting strip 23 as to swing over center or, in other words, over the top of the pivot bolts 24 during the rotation or swinging movement of the connecting strip 23. Thus, in the extended position illustrated in Fig. 1, the lug 30 is shown above and to the rear of the pivot bolts 24 so that the tension spring 32 is effective to urge the connecting strip 23 and its plate 25 into the extended or horizontal position. Conversely, when the plate 25 has been shifted into a vertical position overlying the lens as illustrated in Fig. 2, the lug 30 is disposed above and forwardly of the pivot bolts 24 so that the tension of the spring is effective to urge the plate to remain in closed or collapsed position overlying the lens at 18. In this manner, once that the lens shade has been swung into open or extended position it will be urged to remain in that position by means of the spring 32. On the other hand, if the shade has been collapsed or closed, it will be urged to remain in that position as illustrated in Fig. 2. The upward swinging movement of the plate 25 is limited by the engagement between the rear edge of the connecting strip or top 23 and by ferrules 20 and usually it is necessary to notch the rear edge of the connecting strip 23 as indicated at 34 to partially accommodate these ferrules.

It will be observed from the above described construction that all parts of the lens shade are mounted on the exterior of the lens board frame and in such a manner as not to interfere with the removal of the lens board and all of its associated structure at 18, from within the frame. Consequently, when the lens shade is in extended position the lens board can be readily removed from within its frame by reaching under the shade and pushing plate 36 upwardly to release the lens board and the lens board replaced quite readily by the reverse procedure. Regardless of the nature of the lens that is within the lens board it will be effectively shielded by the plate 25 and the side flaps 28 and 29 against extraneous or undesired light. The single lens shade may be regarded as common to all of the lenses that may be used in the camera by substituting lens boards.

Heretofore, lens shades have been developed which are either attachable to the lens board or to the lens barrel. The objection to these lens shades that are so attached are briefly as follows:

(1) The lens shade when attached to the barrel must be made in different sizes to fit different lens barrels.

(2) Substitution of lenses is apt to require a substitution of shades.

(3) If the shade is inadvertently or accidentally struck while in applied position it may damage either the lens, the lens barrel or associated structure. The improved lens shade by being applied to the lens board frame functions as a lens board for all lenses that may be used in the camera and in the event that it is accidentally struck, the damage, if any, is sustained by the lens board frame rather than the lens, its barrel, or associated structure.

Figure 3:
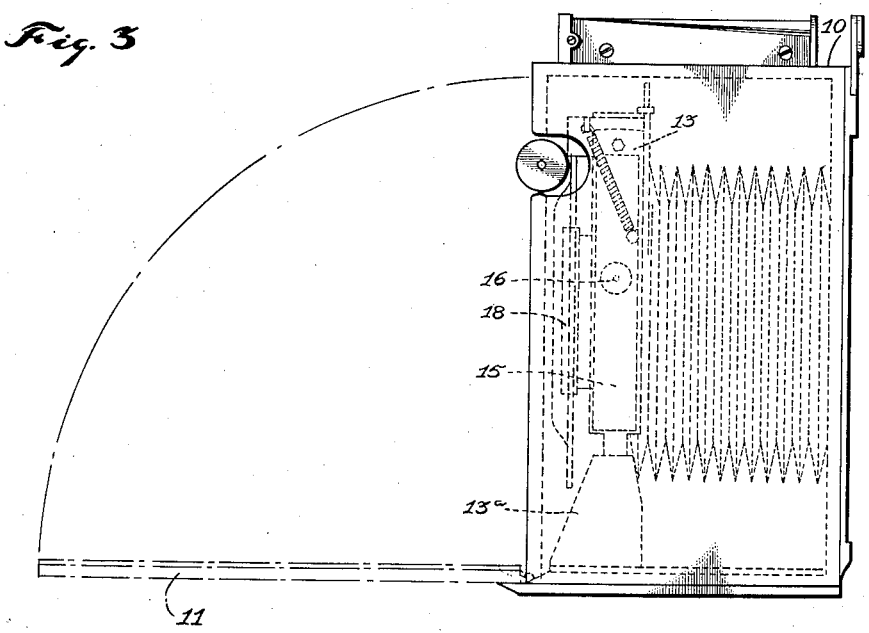
Figure 3 is a view similar to Figure 2 but illustrating the camera in that position wherein its cover has been closed over the collapsed lens shade.

When it is desired to collapse or close the camera, the plate 25 is merely swung down into closed position as illustrated in Fig. 3 and during this collapsing movement the side flaps merely fold between the side edges of the plate 25 and the forward edges of the side plates 21. The lens board frame and its standard may then be returned to a position in the body 10 as illustrated in Fig. 3 and the cover 11 can be swung into closed position without engaging or interfering with the lens shade.

It will be appreciated from the above described construction that in applying the lens shield to the camera that it is unnecessary to modify or alter the construction of the camera in any manner whatsoever. The rising front screws 16 which are normally present on cameras of this character are utilized as a means for attaching the side plates 21 to the lens board frame and the wings 22 assist in rigidly holding the side plates 21 on the lens board frame. Whenever it is necessary to elevate the lens board frame and its contained lens board with relation to the standard 13, the rising front screw nuts 17 can be loosened in the conventional manner and the lens board frame adjusted in the conventional way. In so doing as the lens shield is mounted on the lens board frame it will be raised and lowered therewith so that the shield is always in proper position to properly shield the lens regardless of the position to which it is adjusted. It will be observed that the presence of the shield in no way interferes with the removal and replacement of the lens board whenever this is required.

Various changes may be made in the details of construction without departing from the spirit and scope of the invention as defined by the appended claim.

I claim:

A lens shade for a camera of the type having upright standards and a lens board frame slidable vertically within the standards by means of screws on the lens board frame protruding through slots in the standards and nuts on the screws bearing against the standards and a lens board within the lens board frame, comprising a pair of side members movable with the lens board frame and having apertures therein to allow the side members to be pressed against the standards with the screws protruding through the apertures and the nuts threaded on the screws to clamp the side members against the standards, means on the lower portions of each side member straddling its standard to hold the side member in place but allowing said side members to move up and down with movement of the lens board frame, a lens shade having a pivotal connection with the upper ends of said side members, lugs rigid with the lens shade and adapted to swing over center with relation to the pivotal connection, and spring means connecting said lugs with the side members whereby the lens shade will be urged to remain in open position by the spring means when positioned therein or urged to remain in closed position by the spring means when positioned in that position, said side members, said means on said side members, said spring means, said lugs and said lens shade not being directly connected to the lens board and the above named parts leaving the space in front of the lens board unobstructed when the lens shade is in open position to permit the lens board to be removed.

DALLAS THRONE.

REFERENCES CITED

The following references are of record in the file of this patent:

UNITED STATES PATENTS

| Number | Name | Date |
|---|---|---|
| 993,047 | Folmer | May 23, 1911 |
| 1,426,716 | Custer | Aug. 22, 1922 |
| 1,450,522 | Stinchfield | Apr. 3, 1923 |
| 2,145,793 | Hineline | Jan. 31, 1939 |
| 2,187,093 | Peterson | Jan. 16, 1940 |
| 2,266,914 | Skinner | Dec. 23, 1941 |